US011995011B2

(12) United States Patent
Malik et al.

(10) Patent No.: US 11,995,011 B2
(45) Date of Patent: May 28, 2024

(54) EFFICIENT TURNAROUND POLICY FOR A BUS

(71) Applicant: Micron Technology, Inc., Boise, ID (US)

(72) Inventors: Saira Samar Malik, Lafayette, IN (US); Taeksang Song, San Jose, CA (US); Chinnakrishnan Ballapuram, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 275 days.

(21) Appl. No.: 17/395,303

(22) Filed: Aug. 5, 2021

(65) Prior Publication Data
US 2022/0066961 A1 Mar. 3, 2022

Related U.S. Application Data

(60) Provisional application No. 63/070,576, filed on Aug. 26, 2020.

(51) Int. Cl.
G06F 13/16 (2006.01)
G06F 3/06 (2006.01)

(52) U.S. Cl.
CPC ........ *G06F 13/1668* (2013.01); *G06F 3/0604* (2013.01); *G06F 3/0644* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| 10,545,701 | B1 * | 1/2020 | Mathews | G06F 3/0611 |
| 2019/0196996 | A1 * | 6/2019 | Balakrishnan | G06F 13/30 |
| 2020/0233821 | A1 * | 7/2020 | Kumar | G06F 13/1668 |

* cited by examiner

Primary Examiner — Farley Abad
Assistant Examiner — Dayton Lewis-Taylor
(74) Attorney, Agent, or Firm — Holland & Hart LLP

(57) ABSTRACT

Methods, systems, and devices for an efficient turnaround policy for a bus are described. A device may include a memory and a bus for communicating with the memory. The device may operate the bus in a first direction, relative to the memory, that is associated with a first type of access command. The device may determine, for the memory, that a quantity of queued access commands of a second type are for one or more banks that have satisfied a timing constraint for activating different rows in a same bank. Based on determining that the quantity of queued access commands of the second type are for one or more banks that have satisfied the timing constraint, the device may operate the bus in a second direction, relative to the memory, that is associated with the second type of access command.

22 Claims, 9 Drawing Sheets

EFFICIENT TURNAROUND POLICY FOR A BUS

CROSS REFERENCE

The present Application for Patent claims the benefit of U.S. Provisional Patent Application No. 63/070,576 by MALIK et al., entitled "EFFICIENT TURNAROUND POLICY FOR A BUS," filed Aug. 26, 2020, assigned to the assignee hereof, and expressly incorporated by reference herein.

BACKGROUND

The following relates generally to one or more memory systems and more specifically to an efficient turnaround policy for a bus.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

A device, such as an electronic device, may include a main memory (e.g., a primary memory for storing information among other operations) and a secondary memory that may operate as a cache. Such a configuration may allow the device to benefit from advantages of non-volatile memory (e.g., non-volatility, high storage capacity, low power consumption) while maintaining compatibility with a host device. A non-volatile memory, however, may have a turnaround policy for its data bus that prevents the device from efficiently scheduling access commands to the non-volatile memory in certain situations. For example, if the non-volatile memory has a timing constraint for activating different rows of the same bank, this timing constraint as part of the turnaround policy may prevent the device from efficiently scheduling access commands for the non-volatile memory when there are multiple access commands queued for different rows in the same bank of the non-volatile memory. This may lead to unnecessary delay in scheduling and performing access commands, among other disadvantages.

According to the techniques described herein, a device may efficiently schedule access commands for a non-volatile memory by using a turnaround policy that accounts for timing constraints for activating different areas, such as different rows of the same bank. For example, the device may change the direction of the data bus for the non-volatile memory based on a quantity of queued access commands that are for one or more banks that are ready to be activated (e.g., banks that have satisfied the timing constraint). Thus, the device may issue access commands to one or more banks that are ready to be activated while other banks are in the process of satisfying the timing constraint, thereby increasing the scheduling efficiency and overall performance of the device, among other advantages.

Features of the disclosure are initially described in the context of a system and a memory subsystem as described with reference to FIGS. 1 and 2. Features of the disclosure are described in the context of a timing diagram, as described with reference to FIG. 3, and process flows, as described with reference to FIGS. 4 and 5. These and other features of the disclosure are further illustrated by and described with reference to an apparatus diagram and flowcharts that relate to an efficient turnaround policy as described with reference to FIGS. 6-9.

Figure 1:
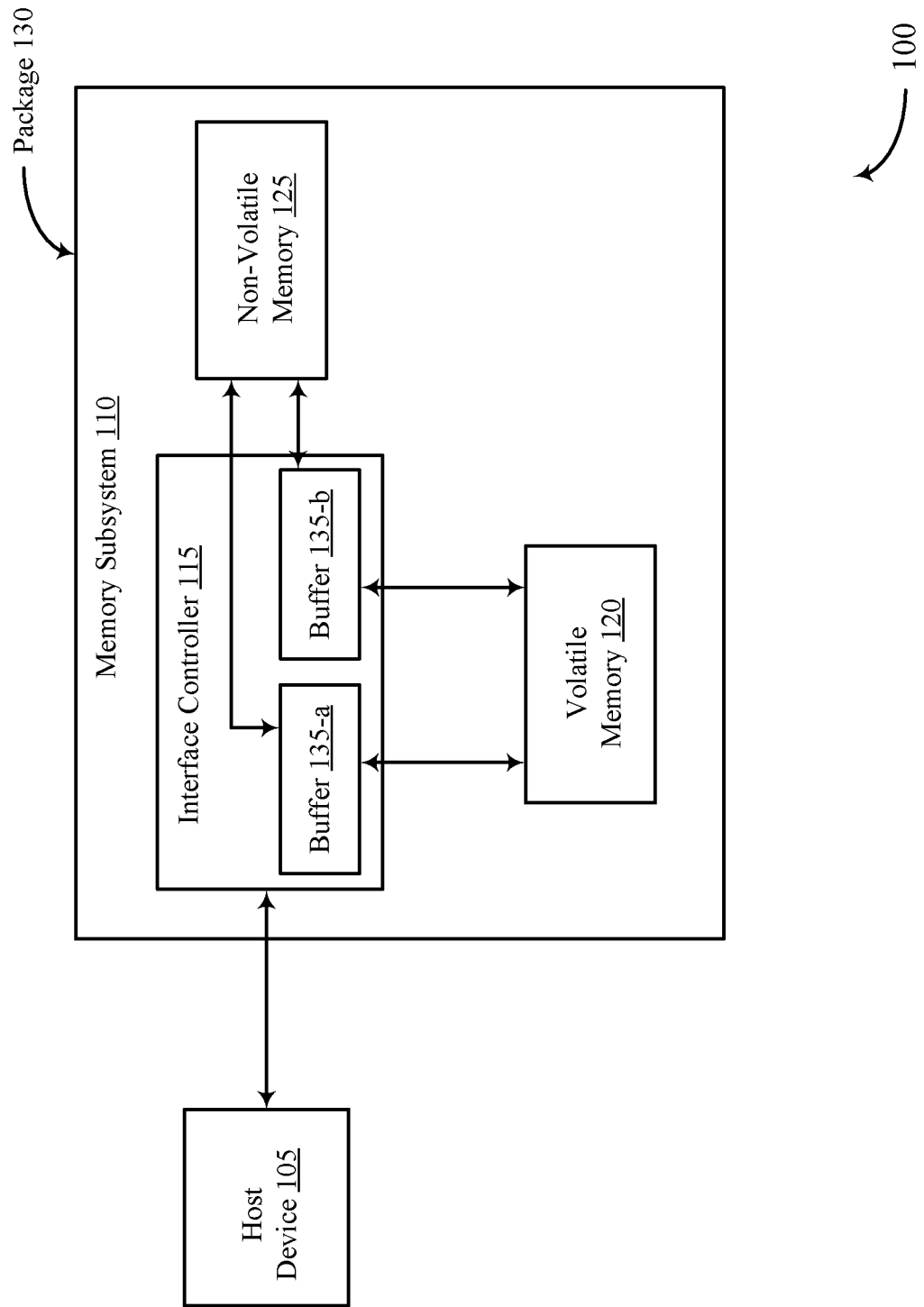
FIG. 1 illustrates an example of a system that supports an efficient turnaround policy for a bus in accordance with examples as disclosed herein.

FIG. 1 illustrates an example of a memory system 100 that supports an efficient turnaround policy for a bus in accordance with examples as disclosed herein. The memory system 100 may be included in an electronic device such a computer or phone. The memory system 100 may include a host device 105 and a memory subsystem 110. The host device 105 may be a processor or system-on-a-chip (SoC) that interfaces with the interface controller 115 as well as other components of the electronic device that includes the memory system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130.

However, the interface controller 115, the volatile memory 120, and the non-volatile memory 125 may be disposed on different, respective dies (e.g., silicon dies).

The devices in the memory system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the memory system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the memory system 100 may be capable of machine-type communication (MTC), machine-to-machine (M2M) communication, or device-to-device (D2D) communication. In some examples, the device associated with the memory system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the memory system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the memory system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the memory system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64 B) or 128 bytes (128 B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the memory system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-a. After storing the data in the buffer 135-a, the interface controller 115 may transfer the data from the buffer 135-a to the volatile memory 120 or the non-volatile memory 125 or both. In write-through mode, the interface controller 115 may transfer the data to both the volatile memory 120 and the non-volatile memory 125. In write-back mode, the interface controller 115 may only transfer the data to the volatile memory 120.

In either mode, the interface controller 115 may identify an appropriate set of one or more volatile memory cells in the volatile memory 120 for storing the data associated with the storage command. To do so, the interface controller 115 may implement set-associative mapping in which each set (e.g., block) of one or more non-volatile memory cells in the non-volatile memory 125 may be mapped to multiple sets of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent retrieval command from the host device 105 for the data can be efficiently satisfied by retrieving the data from the lower-latency volatile memory 120 instead of retrieving the data from the higher-latency non-volatile memory 125. The interface controller 115 may determine which of the n sets of the volatile memory 120 to store the data based on one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-a (e.g., in response to determining that one of the n sets of volatile memory cells stores the requested data) so that it can be transmitted to the host device 105. The term "hit" may be used to refer to the scenario where the volatile memory 120 stores data requested by the host device 105. If then sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-a (e.g., in response to determining that the n sets of volatile memory cells do not store the requested data) so that it can be transmitted to the host device 105. The term "miss" may be used to refer to the scenario where the volatile memory 120 does not store data requested by the host device 105.

In a miss scenario, after transferring the requested data to the buffer 135-a, the interface controller 115 may transfer the requested data from the buffer 135-a to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But the n sets of volatile memory cells may already be storing data for other sets of non-volatile memory cells. So, to preserve this other data, the interface controller 115 may transfer the other data to the buffer 135-b so that it can be transferred to the non-volatile memory 125 for storage. Such a process may be referred to as "eviction" and the data transferred from the volatile memory 120 to the buffer 135-b may be referred to as "victim" data. In some cases, the interface controller 115 may transfer a subset of the victim data from the buffer 135-b to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some cases as "modified" or "dirty" data. In some examples (e.g., when interface controller operates in one mode such as a write-back mode), dirty data may be data that is present in the volatile memory 120 but not present in the non-volatile memory 125.

In some examples, a device, such as the memory subsystem 110 but not limited thereto, may be coupled with or include a data bus that allows the device to communicate data between a memory and another component of the device, such as a scheduler or other processing component. The data bus may be configured so that data can only flow one way at a time; either from the memory to the scheduler, or from the memory to the scheduler for example. However, the device may be able to dynamically switch the direction of the data bus so that data can be communicated in both directions, albeit at different times in some examples. According to the techniques described herein, the device may switch the direction of the data bus when one or more parameters are satisfied so that an increased quantity of access commands can be issued and served relative to other different techniques, thereby improving the performance of the device, among other advantages.

Although described in some instances with reference to a device with a certain configuration (e.g., the configuration of the memory subsystem 110, the configuration of the interface controller 115), the techniques described herein may be implemented by any device that includes a bus that conveys information between two components, such as a memory and a component of the device, such as a scheduler. Additionally, the techniques described herein may apply to any type of bus, including data buses, command buses, and address buses, among others. Further, the techniques described herein may be implemented for any type of memory. However, it should be appreciated that the techniques described herein may be beneficial for memories with relatively small page sizes (e.g., 32 B, 64 B).

Figure 2:
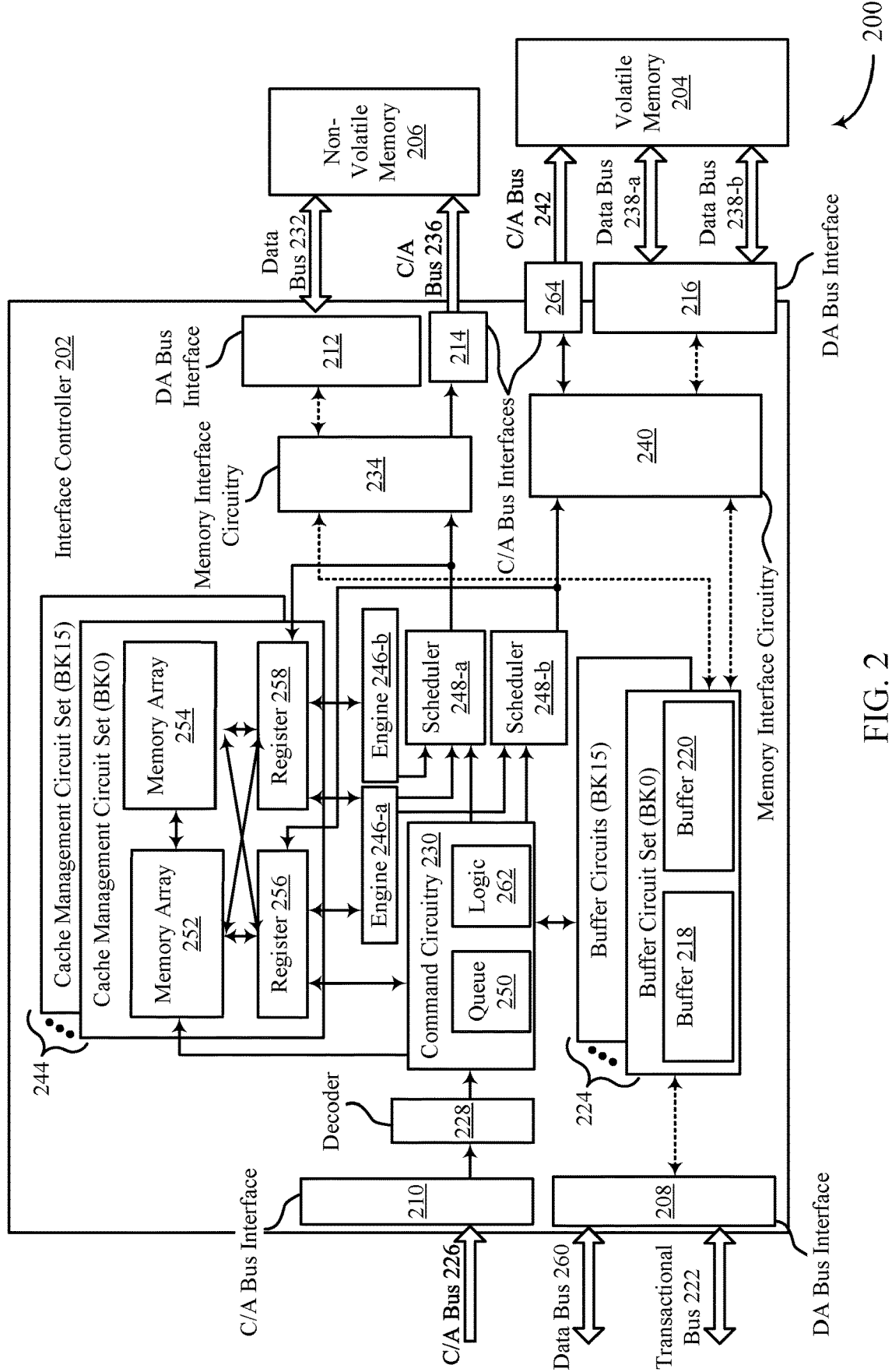
FIG. 2 illustrates an example of a memory subsystem that supports an efficient turnaround policy for a bus in accordance with examples as disclosed herein.

FIG. 2 illustrates an example of a memory subsystem 200 that an efficient turnaround policy for a bus in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the number of memory cells or column addresses in a row, or the number of column addresses accessed during an access operation. Alternatively, a page size may refer to a size of data handled by various interfaces. In some cases, different memory device types may have different page sizes. For example, a DRAM page size (e.g., 2 kB) may be a superset of a non-volatile memory (e.g., FeRAM) page size (e.g., 64 B).

A smaller page size of an FeRAM array may provide various efficiency benefits, as an individual FeRAM cell may require more power to read or write than an individual DRAM cell. For example, a smaller page size for an FeRAM array may facilitate effective energy usage because a smaller number of FeRAM cells may be activated when an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may require more power to read or write than an individual DRAM cell, an FeRAM cell may maintain its stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide efficiency benefits relative to volatile memory cells (e.g., DRAM cells in the volatile memory 204), as it may reduce or eliminate requirements to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the number of columns or memory cells in a row. As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any number of data buses 260 and any number of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 26 2522 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a storage command or retrieval command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-*a* and 135-*b*, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a CDRAM Tag Array (CDT-TA)) and a memory array 254 (e.g., a CDRAM Valid (CDT-V) array), which may be configured to store storage information for BK0. The memory arrays may also be referred to as arrays or buffers in some examples. In some cases, the memory arrays may be or include volatile memory cells, such as SRAM cells.

Storage information may include content information, validity information, or dirty information (or any combination thereof) associated with the volatile memory 204. Content information (which may also be referred to as tag information or address information) may indicate which data is stored in a set of volatile memory cells. For example, the content information (e.g., a tag address) for a set of one or more volatile memory cells may indicate which set of one or more non-volatile memory cells currently has data stored in the set of one or more volatile memory cells. Validity information may indicate whether the data stored in a set of volatile memory cells is actual data (e.g., data having an intended order or form) or placeholder data (e.g., data being random or dummy, not having an intended or important order). And dirty information may indicate whether the data stored in a set of one or more volatile memory cells of the volatile memory 204 is different than corresponding data stored in a set of one or more non-volatile memory cells of the non-volatile memory 206. For example, dirty information may indicate whether data stored in a set of volatile memory cells has been updated relative to data stored in the non-volatile memory 206.

The memory array 252 may include memory cells that store storage information (e.g., content and validity information) for an associated bank (e.g., BK0) of the volatile memory 204. The storage information may be stored on a per-page basis (e.g., there may be respective storage information for each page of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set of volatile memory cells when actual data is stored in that set of volatile memory cells. This bit may be referred to a validity bit or a validity flag. As with the content information, the validity information stored in the memory array 252 may be stored on a per-page basis. Thus, each validity bit may indicate the validity of data stored in an associated page in some examples.

The memory array 254 may be similar to the memory array 252 and may also include memory cells that store validity information for a bank (e.g., BK0) of the volatile memory 204 that is associated with the memory array 252. However, the validity information stored in the memory array 254 may be stored on a sub-block basis as opposed to a per-page basis for the memory array 252. For example, the validity information stored in the memory cells of the memory array 254 may indicate the validity of data for subsets of volatile memory cells in a set (e.g., page) of volatile memory cells. As an example, the validity information in the memory array 254 may indicate the validity of each subset (e.g., 64 B) of data in a page of data stored in BK0 of the volatile memory 204. Storing content information and validity information on a per-page basis in the memory array 252 may allow the interface controller 202 to quickly and efficiently determine whether there is a hit or miss for data in the volatile memory 204. Storing validity information on a sub-block basis may allow the interface controller 202 to determine which subsets of data to preserve in the non-volatile memory 206 during an eviction process.

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, or dirty information) from the memory array 252 or the scheduler 248-*b* or both. The cache management circuitry set may also include a second register (e.g., a register 258 which may be a victim page tag (VPT) register) configured to receive storage information from the memory array 254 and the scheduler 248-a or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on content information from the register 256.

The engine 246-a may be coupled with the register 256, the register 258, and the schedulers 248. The engine 246-a may be configured to receive storage information from various components and issue commands to the schedulers 248 based on the storage information. For example, when the interface controller 202 is in a first mode such as a write-through mode, the engine 246-a may issue commands to the scheduler 248-b and in response the scheduler 248-b to initiate or facilitate the transfer of data from the buffer 218 to both the volatile memory 204 and the non-volatile memory 206. Alternatively, when the interface controller 202 is in a second mode such as a write-back mode, the engine 246-a may issue commands to the scheduler 248-b and in response the scheduler 248-b may initiate or facilitate the transfer of data from the buffer 218 to the volatile memory 204. In the event of a write-back operation, the data stored in the volatile memory 204 may eventually be transferred to the non-volatile memory 206 during a subsequent eviction process.

The engine 246-b may be coupled with the register 258 and the scheduler 248-a. The engine 246-b may be configured to receive storage information from the register 258 and issue commands to the scheduler 248-a based on the storage information. For instance, the engine 246-b may issue commands to the scheduler 248-a to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-b may indicate which one or more subsets (e.g., which 64 B) of the set of data in the buffer 220 should be transferred to the non-volatile memory 206.

The scheduler 248-a may be coupled with various components of the interface controller 202 and may facilitate accessing the non-volatile memory 206 by issuing commands to the memory interface circuitry 234. The commands issued by the scheduler 248-a may be based on commands from the command circuitry 230, the engine 246-a, the engine 246-b, or a combination of these components. Similarly, the scheduler 248-b may be coupled with various components of the interface controller 202 and may facilitate accessing the volatile memory 204 by issuing commands to the memory interface circuitry 240. The commands issued by the scheduler 248-b may be based on commands from the command circuitry 230 or the engine 246-a, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/retrieval commands/requests and write/storage commands/requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, the interface controller 202 may transfer the data to only the volatile memory 204. In either mode, the interface controller 202 may first check to see if the volatile memory 204 has memory cells available to store the data. To do so, the command circuitry 230 may reference the memory array 252 (e.g., using a set of the memory address bits) to determine whether one or more of the n sets (e.g., pages) of volatile memory cells associated with the memory address are empty (e.g., store random or invalid data). In some cases, a set of volatile memory cells in the volatile memory 204 may be referred to as a line or cache line.

If one of then associated sets of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the old data (e.g., existing data) in one of the n associated sets of volatile memory cells to the buffer 220. The dirty information for the old data may also be transferred to the memory array 254 or register 258 for identification of dirty subsets of the old data. After the old data is stored in the buffer 220, the new data can be transferred from the buffer 218 to the volatile memory 204 and the old data can be transferred from the buffer 220 to the non-volatile memory 206. In some cases, dirty subsets of the old data are transferred to the non-volatile memory 206 and clean subsets (e.g., unmodified subsets) are discarded. The dirty subsets may be identified by the engine 246-b based on dirty information transferred (e.g., from the volatile memory 204) to the memory array 254 or register 258 during the eviction process.

In another example, the interface controller 202 may receive a retrieval command from the host device. The retrieval command may be received over the C/A bus 226 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of the n sets of volatile memory cells associated with the memory address stores the requested data. If the requested data is stored in the volatile memory 204, the interface controller 202 may transfer the requested data to the buffer 218 for transmission to the host device over the data bus 260.

If the requested data is not stored in the volatile memory 204, the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated sets of volatile memory cells are available to store the requested data. The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

It should be appreciated that the volatile memory 204 and the non-volatile memory 206 may support various policies for accessing memory cells. For example, the non-volatile memory 206 may comply with an activation policy that requires the non-volatile memory 206 to activate a row before reading data from, or writing data to, the row. Additionally, the non-volatile memory 206 may comply with a closed page policy that requires one row in a bank of the non-volatile memory 206 to be closed (or "deactivated") before another row in the same bank is activated. Due to the activation policy and the closed page policy, and various timing parameters and operating parameters, the non-volatile memory 206 may wait a threshold duration of time between activating different rows of the same memory bank. The threshold duration of time between activating different rows of the same memory bank may be referred to herein as timing constraint tRC, timing parameter tRC, or timing limitation tRC, among other suitable terminology. So the non-volatile memory 206 may satisfy the timing constraint tRC between activating different rows of the same memory bank. A bank that has satisfied the timing constraint tRC may be referred to herein as a bank that is ready to service or execute an access command.

As noted, data may be communicated between the non-volatile memory 206 and the interface controller 202 over the data bus 232. To facilitate the communication of data to and from the non-volatile memory 206, the interface controller 202 (or another component in alternative examples) may (e.g., via the scheduler 248-a) be configured to change the direction of the data bus 232. The direction of the data bus 232 may also be referred to as the mode of the data bus 232 and may refer to the incoming or outgoing flow of data from the perspective of the interface controller 202 (or, conversely, from perspective of the non-volatile memory 206). To operate the data bus 232 in a direction or mode, the interface controller 202 may configure the data bus 232, and any appropriate interface components such as the data bus interface 212, to support an incoming flow of data (with respect to the interface controller 202) or an outgoing flow of data (with respect to the interface controller 202). But re-configuring the data bus 232 to switch directions may be a time consuming process.

To reduce the amount of time spent re-configuring the data bus 232, the interface controller 202 may change the direction of the data bus 232 according to a turnaround policy that defines various conditions for changing the direction of the data bus 232. For example, the interface controller 202 may monitor the read commands and write commands queued for the non-volatile memory and switch the direction of the data bus 232 based on the quantities, and/or relative quantities, of read commands and write commands. For instance, the interface controller 202 may maintain the data bus 232 in read mode until the quantity of queued read commands is lower than a threshold quantity, the quantity of queued write commands is greater than a threshold quantity, and/or the quantity of write commands exceeds (e.g., by a threshold quantity) the quantity of read (e.g., by a threshold quantity).

But in some situations, such a turnaround policy (e.g., one that focuses solely on the quantities of access commands) may introduce inefficiencies. For example, consider a scenario in which there are more read commands than write commands. Further, the read commands are for different rows in the same bank in the non-volatile memory 206 whereas the write commands are for different banks in the non-volatile memory 206. In such scenario, the interface controller 202 may continue to operate the data bus 232 in the read direction—even though doing so results increased latency from satisfying the timing constraint tRC for the bank targeted by the read commands—because the quantity of read commands is greater than the quantity of write commands. Thus, the latency of the non-volatile memory 206 may be increased, which may impair the performance of the interface controller 202.

According to the techniques described herein, the latency of the non-volatile memory 206 may be reduced by using an efficient turnaround policy that allows the interface controller 202 to strategically (e.g., dynamically) change the direction of the data bus 232 so that satisfaction of the timing constraint tRC for one bank does not delay the issuance of access commands for other banks.

Although described with reference to memory subsystem 200, the efficient turnaround policy described herein can be implemented in any device that includes a memory that complies, for example, with the activation policy, closed-page policy, and/or timing constraints described herein.

Figure 3:
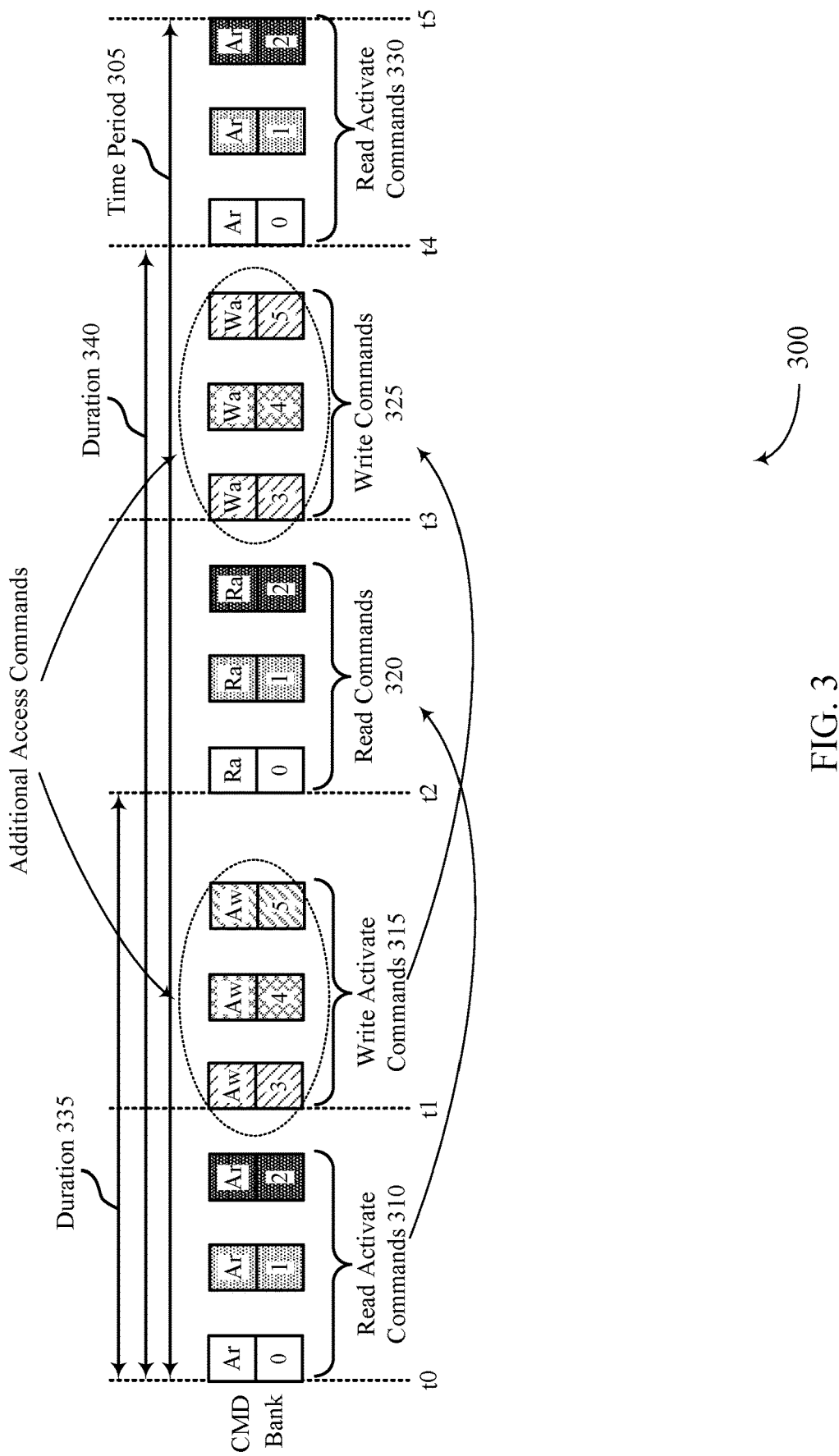
FIG. 3 illustrates an example of a timing diagram for an efficient turnaround policy for a bus in accordance with examples as disclosed herein.

FIG. 3 illustrates a timing diagram 300 for an efficient turnaround policy for a bus in accordance with examples as disclosed herein. The timing diagram 300 illustrates an example of the efficient turnaround policy described herein when a device has a larger quantity of queued read commands than queued write commands for a memory. Thus, the access commands shown in FIG. 3 may be access commands issued by a device using the efficient turnaround policy described herein. The device may be, or include, aspects of the memory subsystem 110, as described with reference to FIG. 1, or the memory subsystem 200, as described with reference to FIG. 2. Or the device may be any type of device that includes various components, for example a memory and a bus, such as a data bus. For example, the device may include a data bus between a memory and a scheduler (or "scheduling component"). Compared to other turnaround policies, the efficient turnaround policy described herein may allow the device to strategically issue access commands so that the timing constraint (e.g., timing penalty) for activating different rows in the same bank is more effectively hidden.

Each access command in timing diagram 300 may include a command opcode (indicating the command type) and address information. The address information may include the row and bank targeted by the access command. In FIG. 3, the type of command (denoted "CMD") is denoted using "Ar," "Ra," "Aw," and "Wa," where "Ar" indicates an activate command for a read operation, "Ra" indicates a read command with an automatic pre-charge, "Aw" indicates an activate for a write operation, and "Wa" indicates a write command with an automatic pre-charge. For concision, activate commands for read operations may be referred to herein as read activate commands, and activate commands for write operations may be referred to herein and write activate commands. A read command or write command with an automatic pre-charge may be a read command or write command that causes the memory to automatically perform a pre-charge operation independent of an explicit pre-charge command. Although described with reference to read commands and write commands with automatic pre-charges, the turnaround policy described herein may be implemented with read commands and write commands that do not have automatic pre-charges or that may additionally or alternatively have other differences or characteristics.

According to the efficient turnaround policy described herein, the device may change the direction of the data bus based on readiness of one or more banks to service (e.g., execute) activate commands, among other factors. Compared to other turnaround policies, the efficient turnaround policy may allow the device to issue more access commands during time period 305, and thus communicate more data over the data bus, thereby improving the performance of the device. For example, in addition to issuing read activate commands 310, read commands 320, and read activate commands 330 during time period 305, the efficient turnaround policy may allow the device to also issue write activate commands 315 and write commands 325, which— under other different turnaround policies—may otherwise not be issued until much later (e.g., after time t5).

As noted, the timing diagram 300 illustrates access commands issued under the efficient turnaround policy described herein. It should be appreciated that the issuance of access commands of different types may be related or linked to the direction or mode of a data bus. For example, write commands may be associated with a first direction of the data bus (or "write mode") and read commands may be associated with a second direction of the data bus (or "read mode"). Thus, issuing different types of commands may be associated with a change in the direction or mode of a data bus so that data associated with the commands can be communicated between the scheduler and the memory. Further, it should be appreciated that increasing the rate of issuance for access commands may increase the rate of data exchanged between the scheduler and the memory, which improves the performance of the device.

In the provided example, there may be more queued read commands for the memory than queued write commands. For example, there may be six queued read commands (although only three are explicitly shown) and three queued write commands. Further, the read commands may be for a first set of banks in the memory and the write commands may be for a second set of banks in the memory. For example, the read commands may be for bank 0, bank 1, and bank 2 in the memory, and the write commands may be for bank 3, bank 4, and bank 5 in the memory. According to the efficient turnaround policy described herein, the device may issue activate commands for the read commands at time t0. For example, the device may issue read activate commands 310 so that a read activate command for bank 0 is issued, a read activate command for bank 1 is issued, and a read activate commands for bank 2 is issued. Each of the read activate commands 310 may ultimately be communicated to the memory.

After issuing the read activate commands 310, the device may wait for duration 335 to elapse before issuing read commands 320. Additionally, the device may wait for duration 340 to elapse before issuing read activate commands 330 for bank 0, bank 1, and bank 2. Duration 335 may represent the minimum amount of time required before a read command or write command can be issued after an associated activate command. Thus, there may a duration 335 between each activate command and its associated read command or write command. In some examples, the duration 335 may be referred to as timing constraint tRCD, timing parameter tRCD, timing limitation tRCD, or other suitable terminology. It should be appreciated that in addition to complying with the timing constraint tRCD, the device may also comply with the timing constraint tRC, which may be represented by duration 340 and, as noted, may be the minimum amount of time required between activation of different rows in a memory bank. Thus, the device may be effectively prevented from issuing activate commands for the first set of memory banks (e.g., bank 0, bank 1, and bank 2) until after duration 340 has expired for each read activate command 310. As an example, the device may be prevented from issuing the read activate command 330 for bank 0 until time t4. The duration 340 between activate commands for a bank may be relative to the issuance of the activate commands.

Rather than waiting until all six read commands are issued to the memory before issuing the write activate commands 315 for the memory, however, the device may issue the write activate commands 315 during duration 335, in accordance with the efficient turnaround policy described here. For example, the device may issue write activate commands 315 at time t1. The device may be able to do this because the write activate commands 315 are for different banks than the read activate commands 310. As a condition for issuing the write activate commands 315 at time t1, the device may determine that each bank targeted by the write commands 325 is ready to service an activate command. That is, the device may determine that the bank targeted by a write command 325 has satisfied or complied with the timing constraint tRC. So, the device may use the satisfaction of the timing constraint tRC, among other factors, as a basis for switching the type of command issued, and thus the direction of the data bus.

After duration 335 has elapsed, the device may issue read commands 320 at time t2. In response to the read commands 320, the device may receive data requested by the read commands over the data bus, which may be configured in read mode. At time t3, the device may issue write commands 325, which may target bank 3, bank 4, and bank 5. There may be a duration 335 between each write command and its associated write activate command so that the timing constraint tRCD is satisfied. To provide data to be written to the memory, the device may configure the data bus to operate in write mode. Thus, the device may re-configure the data bus according to the efficient turnaround policy described herein, which may allow data to be written to the memory sooner relative to other turnaround policies (and without delaying the issuance of the read activate commands 330). For example, despite issuing the write activate commands 315 and the write commands 325, the device may still issue read activate commands 330 at time t4, which may be the earliest time the device is permitted to issue the read activate commands 330 due to the timing constraint tRC. Thus, a device using the efficient turnaround policy described herein may issue a greater quantity of access commands between time t0 and time t5, and in doing so increase the efficiency of the device, among other advantages.

Figure 4:
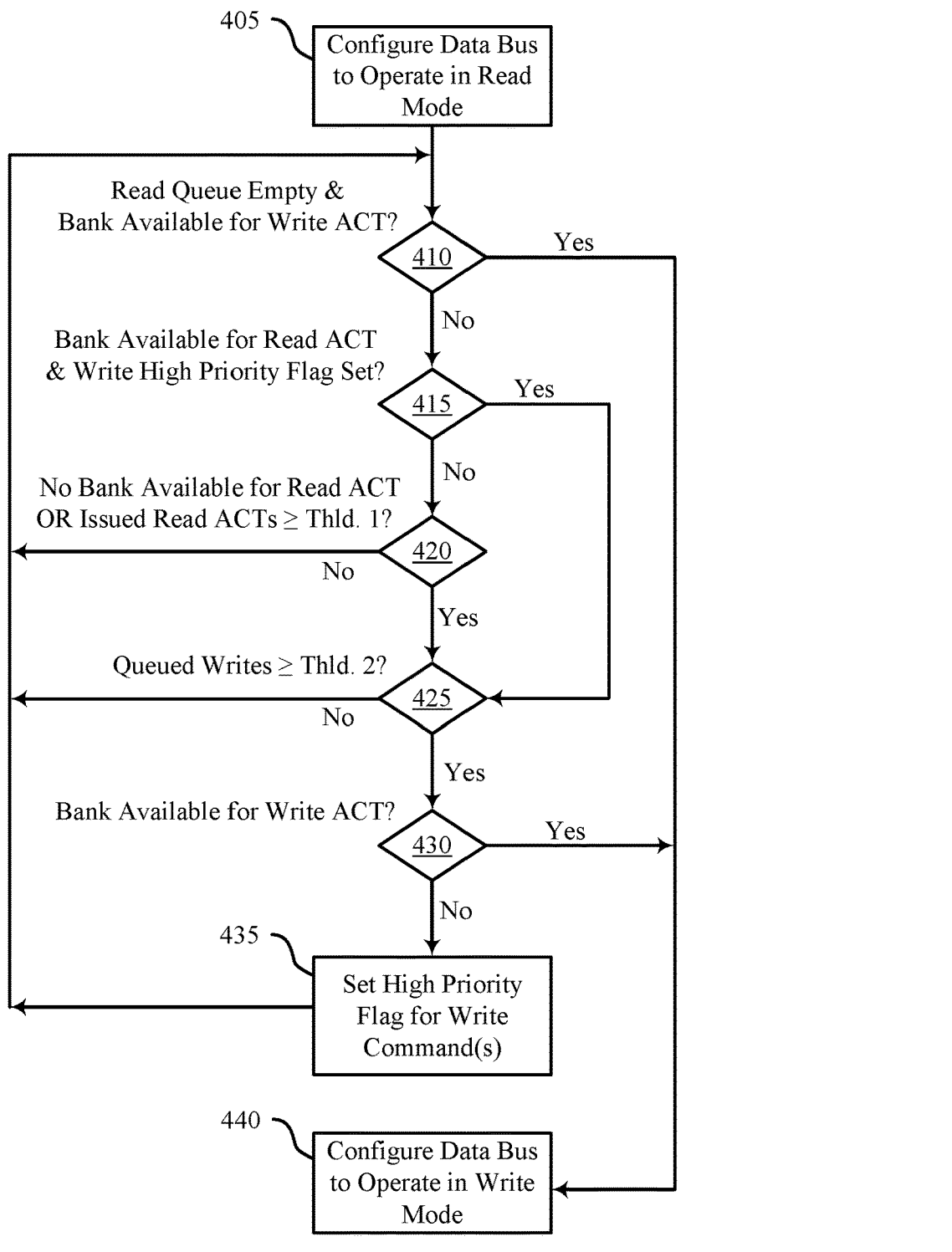
FIG. 4 illustrates an example of a process flow that supports an efficient turnaround policy for a bus in accordance with examples as disclosed herein.

FIG. 4 illustrates an example of a process flow 400 that supports an efficient turnaround policy for a bus in accordance with examples as disclosed herein. Process flow 400 may be implemented by an interface controller 115 as described with reference to FIG. 1 or an interface controller 202 as described with reference to FIG. 2. However, other types of devices may implement process flow 400. The process flow 400 may illustrate the operations of a device that uses the efficient turnaround technique described herein to change the operating mode of a data bus from a read direction to a write direction.

For ease of reference, the process flow 400 is described with reference to a device. For example, aspects of the process flow 400 may be implemented by a device that includes (or is coupled with) a data bus between a component of the device (e.g., a scheduler) and a memory. Additionally or alternatively, aspects of the process flow 400 may be implemented as instructions stored in memory (e.g., firmware stored in the volatile memory 120 and/or the non-volatile memory 125). For example, the instructions, when executed by a controller, may cause the controller to perform the operations of the process flow 400.

At 405, the data bus may be configured to operate in read mode (e.g., the data bus may be configured to operate in a first direction), which may be a mode that supports the communication of data from the memory to the scheduler. In some examples, the data bus may be configured to operate in read command upon powering on or leaving reset. At 410, it may be determined whether 1) a read queue for the memory is empty and 2) at least one bank (or a threshold quantity of banks) targeted by a queued write command is available for a write activate command. The term read queue may refer to a physical or conceptual queue of read commands pending for the memory, and thus the quantity of read commands in the read queue may represent the quantity of read commands queued for the memory. A bank is "available" or "ready" for a write activate command if the bank has satisfied the timing constraint tRC for activating different rows in the bank.

If, at 410, it is determined that 1) the read queue for the memory is empty and 2) at least one bank (or a threshold quantity of banks) targeted by a queued write command is available for a write activate command, the process may proceed to 440. At 440, the data bus may be configured to operate in write mode (e.g., the data bus may be configured to operate in a second direction), which may be a mode that supports the communication of data from the scheduler to the memory.

If, at 410, it is determined that either 1) the read queue for the memory is not empty or 2) no bank (or fewer than a threshold quantity of banks) targeted by a queued write command is available for a write activate command, the process may proceed to 415. At 415, it may be determined whether 1) at least one bank (or a threshold quantity of banks) targeted by a read command is available for a read activate command and 2) any queued write commands are assigned a high priority. A bank is "available" or "ready" for a read activate command if the bank has satisfied the timing constraint tRC for activating different rows in the bank. In some examples, the priority of a write command may be determined by checking a high priority flag for the write command.

If present, the two conditions at 415 may conflict, with the availability of a bank for a read activate command justifying maintenance of the data bus in read mode and the high prioritization of a queued write command justifying a re-configuration of the data bus to write mode. To resolve the conflict that arises when both conditions are present, the device may be configured to proceed to 425. For example, if, at 415, it is determined that 1) at least one bank (or a threshold quantity of banks) targeted by a read command is available for a read activate command and 2) any of the queued write commands are assigned a high priority, the process may proceed to 425. At 425, it may be determined whether the quantity of queued write commands for the memory is greater than or equal (e.g., matches or exceeds) a threshold quantity (e.g., Thld. 2).

If, at 415, it is determined that either 1) no bank (or fewer than a threshold quantity of banks) targeted by a read command is available for a read activate command or 2) none (or some quantity less than a threshold) of the queued write commands are assigned a high priority, the process may proceed to 420. At 420, it may be determined whether 1) no bank (or fewer than a threshold quantity of banks) is available for a read activate command or 2) a threshold quantity (e.g., Thld. 1) of read activate commands (or read commands) have been issued since the data bus was configured in read mode.

If, at 420, it is determined that 1) at least one bank (or greater than a threshold quantity of banks) targeted by a read command is available for a read activate command and 2) fewer than a threshold quantity (e.g., Thld. 1) of read activate commands (or read commands) have been issued since the data bus was configured in read mode, the data bus may be maintained in read mode and the process may proceed to 410.

If, at 420, it is determined that 1) no bank (or fewer than a threshold quantity of banks) is available for a read activate command or 2) a threshold quantity (e.g., Thld. 1) of read activate commands (or read commands) have been issued since the data bus was configured in read mode, the process may proceed to 425. At 425, it may be determined whether the quantity of queued write commands for the memory is greater than or equal to a threshold quantity (e.g., Thld. 2). Additionally or alternatively, at 425 it may be determined whether a queued write command for the memory is a write command for sixteen bytes (e.g., a WR16 command) or a masked write command (e.g., MWR).

If, at 425, it is determined that the quantity of queued write commands for the memory is less than the threshold quantity (e.g., Thld. 2), the data bus may be maintained in read mode and the process may proceed to 410. Additionally or alternatively, if, at 425, it is determined that no queued write command for the memory is a WR16 command MWR command, the process may proceed to 410. If, at 425, it is determined that the quantity of queued write commands for the memory is greater than or equal to the threshold quantity (e.g., Thld. 2), the process may proceed to 430. Additionally or alternatively, if, at 425, it is determined that a queued write command for the memory is a WR16 command MWR command, the process may proceed to 430.

At 430, it may be determined whether a bank targeted by a queued write command is available for a write activate command. If, at 430, it is determined that no bank targeted by a write command is available for a write activate command, the process may proceed to 435. At 435, the high priority flag for one or more queued write commands may be set to indicate that the one or more write commands are assigned a high priority (e.g., relative to other queued access commands). If, at 430, it is determined that a bank targeted by a write command is available for a write activate command, the data bus may be configured to operate in write mode at 440.

Thus, a device may be configured to use a bank's satisfaction of the timing constraint tRC as a basis, alone or in combination with one or more other bases, for changing the operating mode of a data bus from a read direction to a write direction. It should be appreciated that the various thresholds used in the process flow 400 may be configurable and thus may be dynamically updated by the device based on one or more operating parameters or operating conditions of the device or the system. It should also be appreciated that alternative examples of the process flow 400 may be implemented in which some operations are performed in a different order than described or are not performed at all. Further, operations may include additional features not mentioned, or additional operations may be added.

Figure 5:
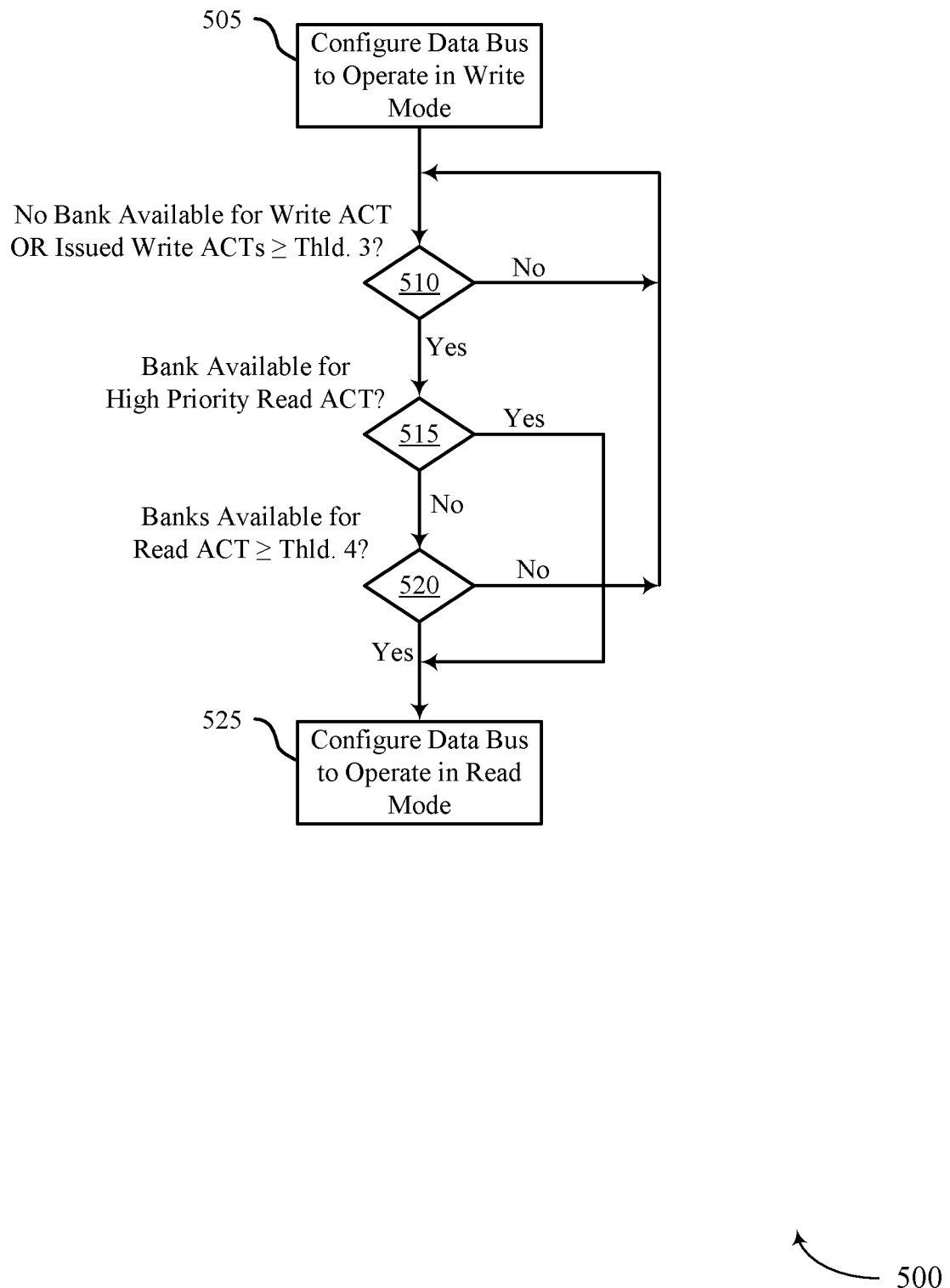
FIG. 5 illustrates an example of a process flow that supports an efficient turnaround policy for a bus in accordance with examples as disclosed herein.

FIG. 5 illustrates an example of a process flow 500 that that supports an efficient turnaround policy for a bus in accordance with examples as disclosed herein. Process flow 500 may be implemented by an interface controller 115 as described with reference to FIG. 1 or an interface controller 202 as described with reference to FIG. 2. However, other types of devices may implement process flow 500. Process flow 500 may illustrate the operations of a device that uses the efficient turnaround technique described herein to change the operating mode of a data bus from a write direction to a read direction.

For ease of reference, the process flow 500 is described with reference to a device. For example, aspects of the process flow 500 may be implemented by a device that includes (or is coupled with) a data bus between a component of the device (e.g., a scheduler) and a memory. Additionally or alternatively, aspects of the process flow 500 may be implemented as instructions stored in memory (e.g., firmware stored in the volatile memory 120 and/or the non-volatile memory 125). For example, the instructions, when executed by a controller, may cause the controller to perform the operations of the process flow 500.

At 505, the data bus may be configured to operate in write mode (e.g., the data bus may be configured to operate in a first direction). At 510, it may be determined whether 1) no bank (or fewer than a threshold quantity of banks) is available for a write activate command or 2) a threshold quantity (e.g., Thld. 3) of write activate commands (or write commands) have been issued since the data bus was configured in write mode. If, at 420, it is determined that 1) at least one bank (or greater than a threshold quantity of banks) targeted by a write command is available for a write activate command and 2) fewer than the threshold quantity (e.g., Thld. 3) of write commands have been issued since the data bus was configured in write mode, the data bus may be maintained in write mode and the process may proceed to 510.

If, at 510, it is determined that 1) no bank (or fewer than a threshold quantity of banks) is available for a write activate command or 2) a threshold quantity (e.g., Thld. 3) of write activate commands (or write commands) have been issued since the data bus was configured in write mode, the process may proceed to 515. At 515, it may be determined whether any queued read command is assigned a high priority and targets a bank that is available for a read activate command. If, at 515, it is determined that a queued read command is assigned a high priority and targets a bank that is available for a read activate command, the data bus may be configured to operate in read mode at 525.

If, at 515, it is determined that none of the queued read commands (some quantity less than a threshold) are assigned a high priority and target a bank that is available for a read activate command, the process may proceed to 520. At 520, it may be determined whether the quantity of banks available for read activate commands is greater than or equal to a threshold quantity (e.g., Thld. 4). If, at 520, it is determined that the quantity of banks available for read activate commands is less than the threshold quantity (e.g., Thld. 4), the data bus may be maintained in write mode and the process may proceed to 510. If, at 520, the quantity of banks available for read activate commands is greater than or equal to the threshold quantity (e.g., Thld. 4), the data bus may be configured to operate in read mode at 525.

Thus, a device may use a bank's satisfaction of the timing constraint tRC as a basis for changing the operating mode of a data bus from a write direction to a read direction. It should be appreciated that the various thresholds used in the process flow 500 may be configurable and thus may be dynamically updated by the device based on one or more operating parameters of the device or the system. It should also be appreciated that alternative examples of the process flow 500 may be implemented in which some operations are performed in a different order than described or are not performed at all. Additionally, operations may include additional features not mentioned, or additional operations may be added.

Figure 6:
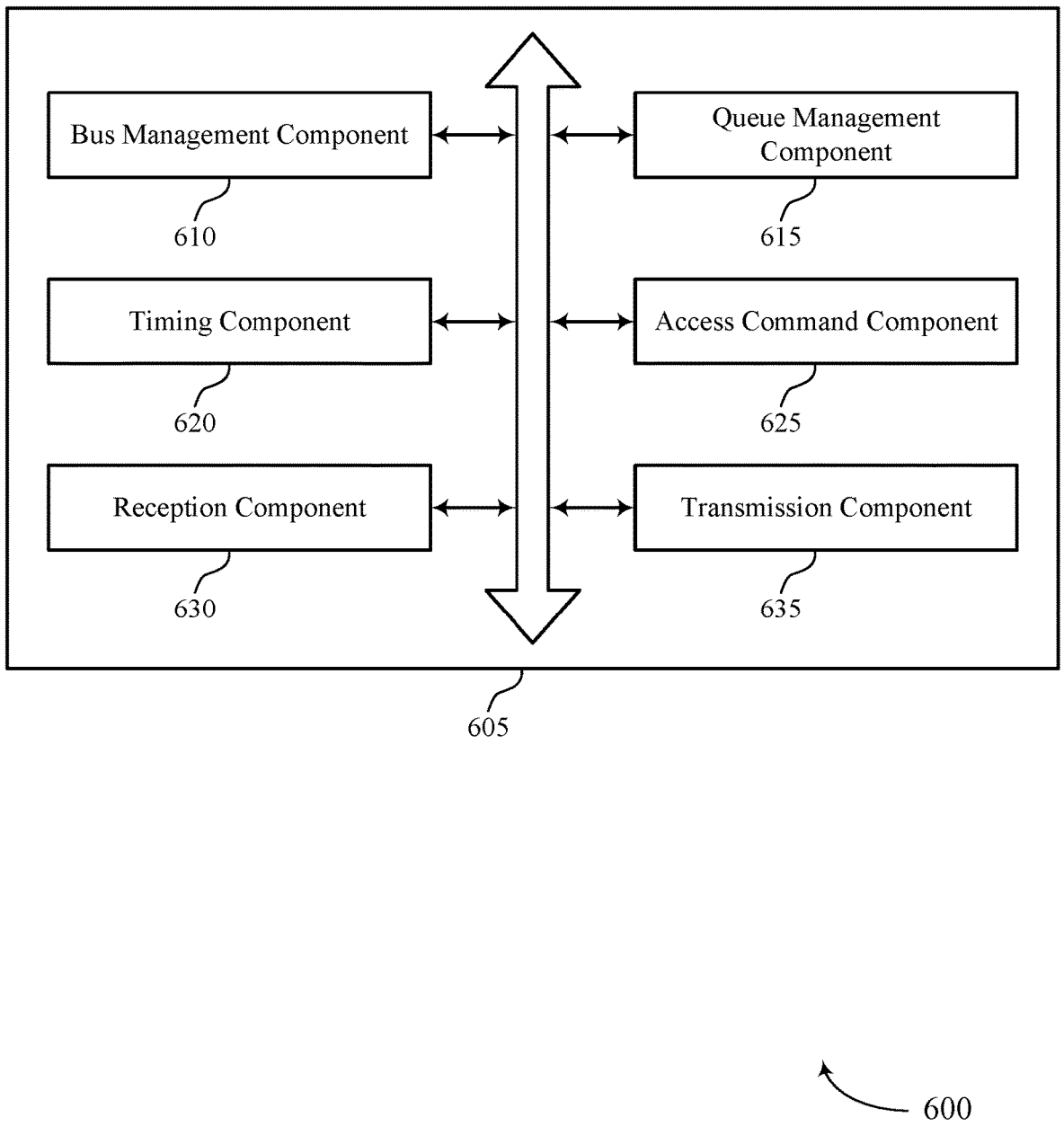
FIG. 6 shows a block diagram of a device that supports an efficient turnaround policy for a bus in accordance with aspects of the present disclosure.

FIG. 6 shows a block diagram 600 of an apparatus 605 that supports an efficient turnaround policy for a bus in accordance with examples as disclosed herein. The apparatus 605 may be an example of aspects of a memory subsystem 110, an interface controller 115, a memory subsystem 200, or an interface controller 202, among other devices. The apparatus 605 may include a bus management component 610, a queue management component 615, a timing component 620, an access command component 625, a reception component 630, and a transmission component

635. Each of these components may communicate, directly or indirectly, with one another (e.g., via one or more buses or other conductive connections).

The bus management component 610 may be or include logic, circuitry, a processor, a controller, or other components capable of performing the functions described herein. The queue management component 615 may be or include logic, circuitry, a processor, a controller, or other components capable of performing the functions described herein. The timing component 620 may be or include logic, circuitry, a processor, a controller, or other components capable of performing the functions described herein. The access command component 625 may be or include logic, circuitry, a processor, a controller, or other components capable of performing the functions described herein. The reception component 630 may be or include logic, circuitry, a processor, a controller, or other components capable of performing the functions described herein. The transmission component 635 may be or include logic, circuitry, a processor, a controller, or other components capable of performing the functions described herein.

The bus management component 610 may operate a data bus for the memory in a first direction that is relative to the memory and associated with a first type of access command.

In some examples, the bus management component 610 may operate, based on determining that the quantity of queued access commands of the second type are for banks that have satisfied the timing constraint, the data bus in a second direction associated with the second type of access command.

In some examples, the bus management component 610 may configure a data bus for the memory to operate in a first direction for communicating data read from the memory.

In some examples, the bus management component 610 may configure, based on determining that the quantity of write commands queued for the memory are for banks that have satisfied the timing constraint, the data bus to operate in a second direction for communicating data to the memory.

In some examples, the bus management component 610 may configure a data bus for the memory to operate in a first direction for communicating data to the memory.

In some examples, the bus management component 610 may configure, based on determining that the quantity of read commands queued for the memory are for banks that have satisfied the timing constraint, the data bus to operate in a second direction for communicating data read from the memory.

In some cases, the first direction supports the communication of data from the memory and the first type of access command includes a read command, and where the second direction supports the communication of data to the memory and the second type of access command includes a write command.

The queue management component 615 may determine, for the memory, that a quantity of queued access commands of a second type are for banks that have satisfied a timing constraint for activating different rows in a same bank.

In some examples, the queue management component 615 may determine that a quantity of write commands queued for the memory are for banks that have satisfied a timing constraint for activating different rows in a same bank.

In some examples, the queue management component 615 may determine that a quantity of read commands queued for the memory are for banks that have satisfied a timing constraint for activating different rows in a same bank.

In some examples, the queue management component 615 may determine that the quantity of queued access commands of the second type satisfies a threshold quantity, where the data bus is configured to operate in the second direction based on determining that the threshold quantity is satisfied.

In some examples, the queue management component 615 may determine that fewer than a threshold quantity of queued commands of the first type are for banks that have satisfied the timing constraint, where the data bus is configured to operate in the second direction based on determining that fewer than the threshold quantity of queued commands of the first type are for banks that have satisfied the timing constraint.

In some examples, the queue management component 615 may determine that the quantity of queued write commands satisfies a threshold quantity, where the data bus is configured to operate in the second direction based on determining that the threshold quantity is satisfied.

In some examples, the queue management component 615 may compare the quantity of queued write commands with the threshold quantity, where the determination that the quantity of queued write commands satisfies the threshold quantity is based on the comparing.

In some examples, the queue management component 615 may determine that at least one write command in the quantity of queued write commands is assigned a higher priority relative to other queued write commands, where the comparison is based on determining that the at least one write command is assigned the higher priority.

In some examples, the queue management component 615 may determine that a quantity of read commands issued after configuring the data bus to operate in the first direction satisfies a threshold quantity, where the data bus is configured to operate in the second direction based on determining that the threshold quantity is satisfied.

In some examples, the queue management component 615 may determine that fewer than a threshold quantity of queued read commands are for banks that have satisfied the timing constraint for activating different rows, where the data bus is configured to operate in the second direction based on determining that fewer than the threshold quantity of queued read commands are for banks that have satisfied the timing constraint for activating different rows.

In some examples, the queue management component 615 may determine that the quantity of queued read commands satisfies a threshold quantity, where the data bus is configured to operate in the second direction based on determining that the threshold quantity is satisfied.

In some examples, the queue management component 615 may compare the quantity of queued read commands with the threshold quantity, where the determination that the quantity of queued read commands satisfies the threshold quantity is based on the comparison.

In some examples, the queue management component 615 may determine that the quantity of queued read commands are assigned a low priority, where the comparison is based on determining that the quantity of queued read commands are assigned the low priority.

In some examples, the queue management component 615 may determine that a quantity of write commands issued after configuring the data bus to operate in the first direction satisfies a threshold quantity, where the data bus is configured to operate in the second direction based on determining that the threshold quantity is satisfied.

In some examples, the queue management component 615 may determine that fewer than a threshold quantity of queued write commands are for banks that have satisfied the timing constraint for activating different rows, where the data bus is configured to operate in the second direction based on determining that fewer than the threshold quantity of queued write commands are for banks that have satisfied the timing constraint for activating different rows.

The timing component 620 may determine, for each bank of the banks, that a threshold duration has elapsed since a last activate command was issued for that bank, where the banks are determined to have satisfied the timing constraint based on determining that the threshold duration has elapsed for each bank.

In some examples, the timing component 620 may determine, for each bank of the banks, that a threshold duration has elapsed since a last activate command was issued for that bank, where the banks are determined to have satisfied the timing constraint based on determining that the threshold duration has elapsed for each bank.

In some examples, the timing component 620 may determine, for each bank of the banks, that a threshold duration has elapsed since a last activate command was issued for that bank, where the banks are determined to have satisfied the timing constraint based on determining that the threshold duration has elapsed for each bank.

The access command component 625 may issue activate commands associated with the quantity of queued access commands of the second type to the banks in between issuing activate commands associated with commands of the first type for different banks.

In some examples, the access command component 625 may issue activate commands associated with the quantity of queued write commands to the banks in between issuing activate commands associated with read commands for different banks.

In some examples, the access command component 625 may transmit the write commands to the memory, the write commands associated with second data.

In some examples, the access command component 625 may issue activate commands associated with the quantity of queued read commands to the banks in between issuing activate commands associated with write commands for different banks.

The reception component 630 may receive first data requested by the read commands over the data bus while the data bus is configured in the first direction.

In some examples, the reception component 630 may receive second data over the data bus after configuring the data bus to operate in the second direction.

The transmission component 635 may transmit the second data over the data bus after configuring the data bus to operate in the second direction.

In some examples, the transmission component 635 may transmit first data associated with the queued write commands over the data bus while the data bus is configured to operate in the first direction.

Figure 7:
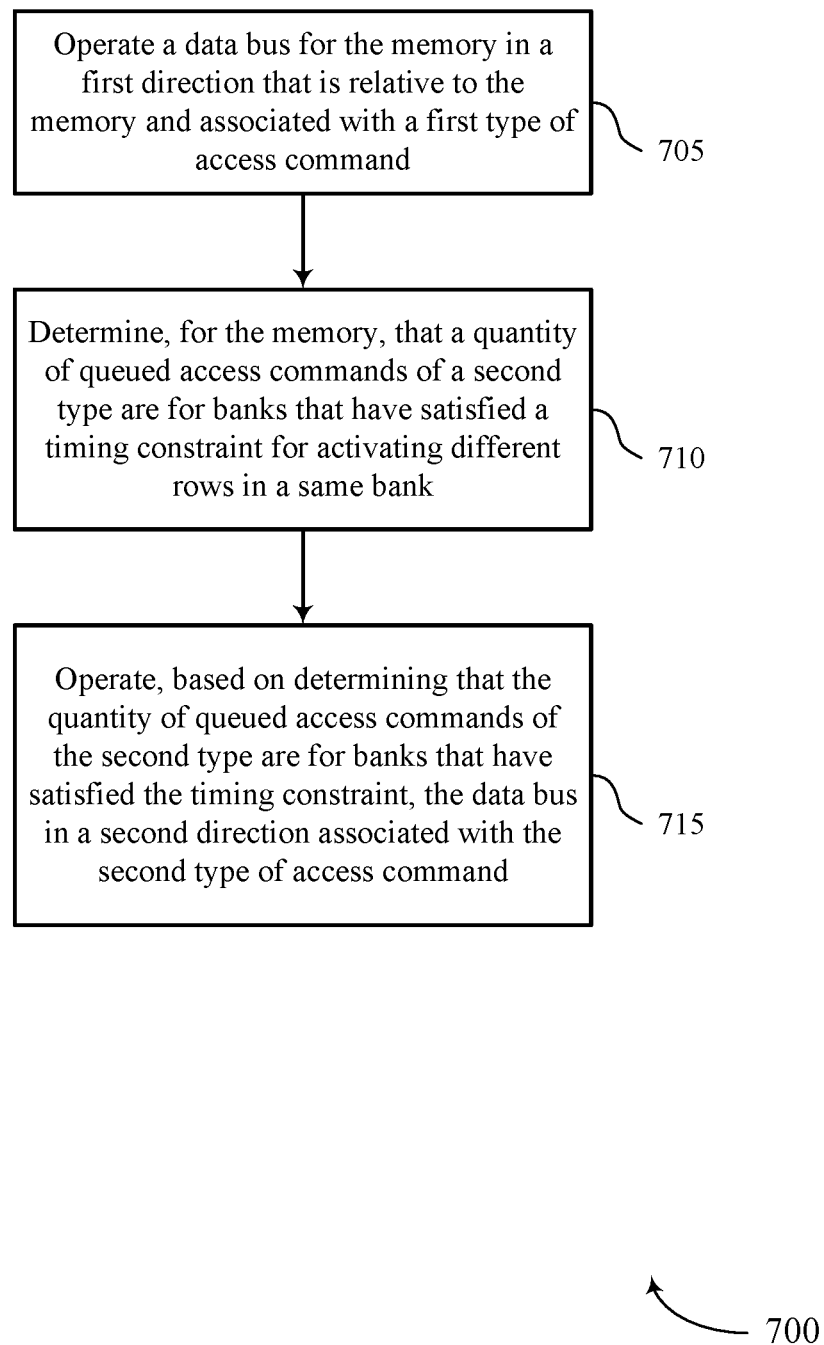
FIGS. 7 through 9 show flowcharts illustrating a method or methods that support an efficient turnaround policy for a bus in accordance with examples as disclosed herein.

FIG. 7 shows a flowchart illustrating a method or methods 700 that supports an efficient turnaround policy for a bus in accordance with aspects of the present disclosure. The operations of method 700 may be implemented by a device or its components as described herein. For example, the operations of method 700 may be performed by a device as described with reference to FIGS. 1 and 2. In some examples, a device may execute a set of instructions to control the functional elements of the device to perform the described functions. Additionally or alternatively, a device may perform aspects of the described functions using special-purpose hardware.

In some examples, the operations of method 700 may be implemented by an apparatus that includes a memory and a controller coupled with the memory. The controller configured to cause the apparatus to perform the operations of method 700.

At 705, the device may operate a data bus for the memory in a first direction that is relative to the memory and associated with a first type of access command. The operations of 705 may be performed according to the methods described herein. In some examples, aspects of the operations of 705 may be performed by a bus management component as described with reference to FIG. 6.

At 710, the device may determine, for the memory, that a quantity of queued access commands of a second type are for banks that have satisfied a timing constraint for activating different rows in a same bank. The operations of 710 may be performed according to the methods described herein. In some examples, aspects of the operations of 710 may be performed by a queue management component as described with reference to FIG. 5.

At 715, the device may operate, based on determining that the quantity of queued access commands of the second type are for banks that have satisfied the timing constraint, the data bus in a second direction associated with the second type of access command. The operations of 715 may be performed according to the methods described herein. In some examples, aspects of the operations of 715 may be performed by a bus management component as described with reference to FIG. 5.

In some examples, an apparatus as described herein may perform a method or methods, such as the method 700. The apparatus may include a memory and a controller coupled with the memory that is configured to cause the apparatus to perform the techniques described herein. The apparatus may include features, means, or instructions (e.g., a non-transitory computer-readable medium storing instructions executable by a processor) for operating a data bus for the memory in a first direction that is relative to the memory and associated with a first type of access command, determining, for the memory, that a quantity of queued access commands of a second type are for banks that have satisfied a timing constraint for activating different rows in a same bank, and operating, based on determining that the quantity of queued access commands of the second type are for banks that have satisfied the timing constraint, the data bus in a second direction associated with the second type of access command.

Some examples of the method 700 and the apparatus described herein may further include operations, features, means, or instructions for determining, for each bank of the banks, that a threshold duration may have elapsed since a last activate command was issued for that bank, where the banks may be determined to may have satisfied the timing constraint based on determining that the threshold duration may have elapsed for each bank.

Some examples of the method 700 and the apparatus described herein may further include operations, features, means, or instructions for determining that the quantity of queued access commands of the second type satisfies a threshold quantity, where the data bus may be configured to operate in the second direction based on determining that the threshold quantity may be satisfied.

Some examples of the method 700 and the apparatus described herein may further include operations, features, means, or instructions for determining that fewer than a threshold quantity of queued commands of the first type may be for banks that may have satisfied the timing constraint, where the data bus may be configured to operate in the second direction based on determining that fewer than the threshold quantity of queued commands of the first type may be for banks that may have satisfied the timing constraint.

Some examples of the method 700 and the apparatus described herein may further include operations, features, means, or instructions for issuing activate commands associated with the quantity of queued access commands of the second type to the banks in between issuing activate commands associated with commands of the first type for different banks.

In some examples of the method 700 and the apparatus described herein, the first direction supports the communication of data from the memory and the first type of access command includes a read command, and where the second direction supports the communication of data to the memory and the second type of access command includes a write command.

Figure 8:
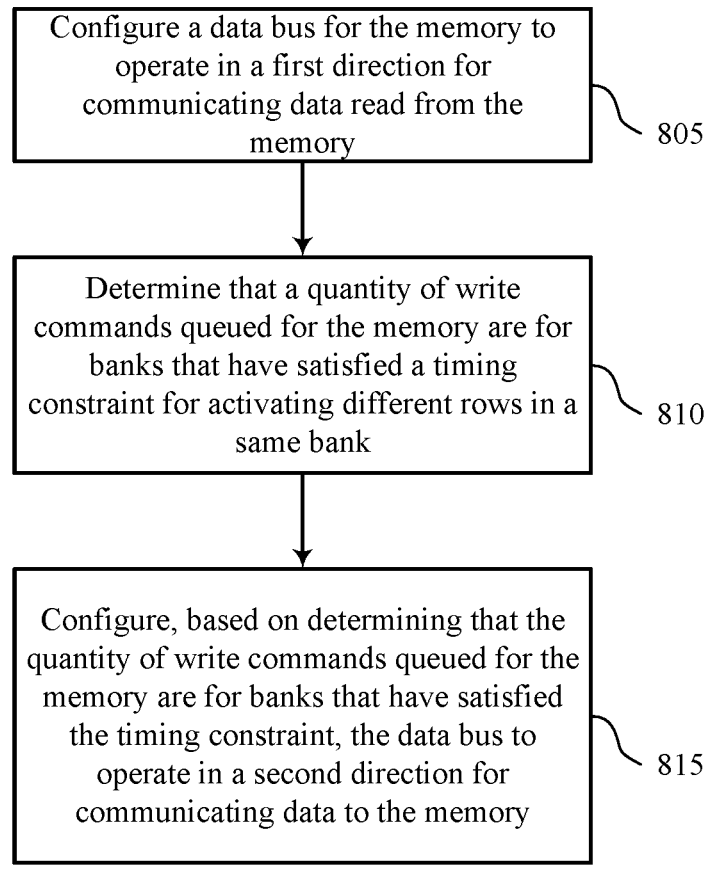

FIG. 8 shows a flowchart illustrating a method or methods 800 that supports an efficient turnaround policy for a bus in accordance with aspects of the present disclosure. The operations of method 800 may be implemented by a device or its components as described herein. For example, the operations of method 800 may be performed by a device as described with reference to FIGS. 1 and 2. In some examples, a device may execute a set of instructions to control the functional elements of the device to perform the described functions. Additionally or alternatively, a device may perform aspects of the described functions using special-purpose hardware.

In some examples, the operations of method 800 may be implemented by an apparatus that includes a memory and a controller coupled with the memory. The controller configured to cause the apparatus to perform the operations of method 800.

At 805, the device may configure a data bus for the memory to operate in a first direction for communicating data read from the memory. The operations of 805 may be performed according to the methods described herein. In some examples, aspects of the operations of 805 may be performed by a bus management component as described with reference to FIG. 6.

At 810, the device may determine that a quantity of write commands queued for the memory are for banks that have satisfied a timing constraint for activating different rows in a same bank. The operations of 810 may be performed according to the methods described herein. In some examples, aspects of the operations of 810 may be performed by a queue management component as described with reference to FIG. 6.

At 815, the device may configure, based on determining that the quantity of write commands queued for the memory are for banks that have satisfied the timing constraint, the data bus to operate in a second direction for communicating data to the memory. The operations of 815 may be performed according to the methods described herein. In some examples, aspects of the operations of 815 may be performed by a bus management component as described with reference to FIG. 6.

In some examples, an apparatus as described herein may perform a method or methods, such as the method 800. The apparatus may include a memory and a controller coupled with the memory that is configured to cause the apparatus to perform the techniques described herein. The apparatus may include features, means, or instructions (e.g., a non-transitory computer-readable medium storing instructions executable by a processor) for configuring a data bus for the memory to operate in a first direction for communicating data read from the memory, determining that a quantity of write commands queued for the memory are for banks that have satisfied a timing constraint for activating different rows in a same bank, and configuring, based on determining that the quantity of write commands queued for the memory are for banks that have satisfied the timing constraint, the data bus to operate in a second direction for communicating data to the memory.

Some examples of the method 800 and the apparatus described herein may further include operations, features, means, or instructions for determining, for each bank of the banks, that a threshold duration may have elapsed since a last activate command was issued for that bank, where the banks may be determined to may have satisfied the timing constraint based on determining that the threshold duration may have elapsed for each bank.

Some examples of the method 800 and the apparatus described herein may further include operations, features, means, or instructions for determining that the quantity of queued write commands satisfies a threshold quantity, where the data bus may be configured to operate in the second direction based on determining that the threshold quantity may be satisfied.

Some examples of the method 800 and the apparatus described herein may further include operations, features, means, or instructions for comparing the quantity of queued write commands with the threshold quantity, where the determination that the quantity of queued write commands satisfies the threshold quantity may be based on the comparing, and determining that at least one write command in the quantity of queued write commands may be assigned a higher priority relative to other queued write commands, where the comparison may be based on determining that the at least one write command may be assigned the higher priority.

Some examples of the method 800 and the apparatus described herein may further include operations, features, means, or instructions for determining that a quantity of read commands issued after configuring the data bus to operate in the first direction satisfies a threshold quantity, where the data bus may be configured to operate in the second direction based on determining that the threshold quantity may be satisfied.

Some examples of the method 800 and the apparatus described herein may further include operations, features, means, or instructions for determining that fewer than a threshold quantity of queued read commands may be for banks that may have satisfied the timing constraint for activating different rows, where the data bus may be configured to operate in the second direction based on determining that fewer than the threshold quantity of queued read commands may be for banks that may have satisfied the timing constraint for activating different rows.

Some examples of the method 800 and the apparatus described herein may further include operations, features, means, or instructions for issuing activate commands associated with the quantity of queued write commands to the banks in between issuing activate commands associated with read commands for different banks.

Some examples of the method 800 and the apparatus described herein may further include operations, features, means, or instructions for receiving first data requested by the read commands over the data bus while the data bus may be configured in the first direction, transmitting the write commands to the memory, the write commands associated with second data, and transmitting the second data over the data bus after configuring the data bus to operate in the second direction.

Figure 9:
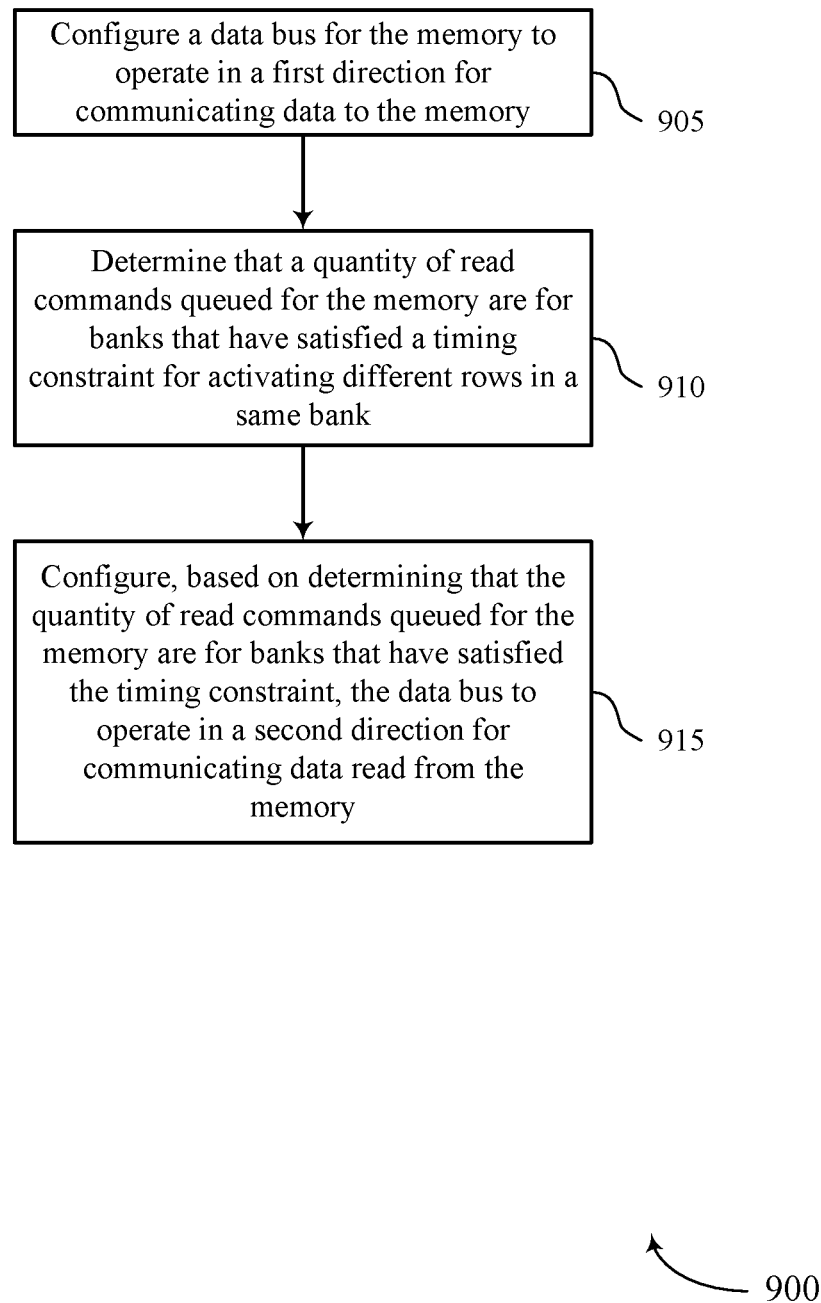

FIG. 9 shows a flowchart illustrating a method or methods 900 that supports an efficient turnaround policy for a bus in accordance with aspects of the present disclosure. The operations of method 900 may be implemented by a device or its components as described herein. For example, the operations of method 900 may be performed by a device as described with reference to FIGS. 1 and 2. In some examples, a device may execute a set of instructions to control the functional elements of the device to perform the described functions. Additionally or alternatively, a device may perform aspects of the described functions using special-purpose hardware.

In some examples, the operations of method 900 may be implemented by an apparatus that includes a memory and a controller coupled with the memory. The controller configured to cause the apparatus to perform the operations of method 900.

At 905, the device may configure a data bus for the memory to operate in a first direction for communicating data to the memory. The operations of 905 may be performed according to the methods described herein. In some examples, aspects of the operations of 905 may be performed by a bus management component as described with reference to FIG. 6.

At 910, the device may determine that a quantity of read commands queued for the memory are for banks that have satisfied a timing constraint for activating different rows in a same bank. The operations of 910 may be performed according to the methods described herein. In some examples, aspects of the operations of 910 may be performed by a queue management component as described with reference to FIG. 6.

At 915, the device may configure, based on determining that the quantity of read commands queued for the memory are for banks that have satisfied the timing constraint, the data bus to operate in a second direction for communicating data read from the memory. The operations of 915 may be performed according to the methods described herein. In some examples, aspects of the operations of 915 may be performed by a bus management component as described with reference to FIG. 6.

In some examples, an apparatus as described herein may perform a method or methods, such as the method 900. The apparatus may include a memory and a controller coupled with the memory that is configured to cause the apparatus to perform the techniques described herein. The apparatus may include features, means, or instructions (e.g., a non-transitory computer-readable medium storing instructions executable by a processor) for configuring a data bus for the memory to operate in a first direction for communicating data to the memory, determining that a quantity of read commands queued for the memory are for banks that have satisfied a timing constraint for activating different rows in a same bank, and configuring, based on determining that the quantity of read commands queued for the memory are for banks that have satisfied the timing constraint, the data bus to operate in a second direction for communicating data read from the memory.

Some examples of the method 900 and the apparatus described herein may further include operations, features, means, or instructions for determining, for each bank of the banks, that a threshold duration may have elapsed since a last activate command was issued for that bank, where the banks may be determined to may have satisfied the timing constraint based on determining that the threshold duration may have elapsed for each bank.

Some examples of the method 900 and the apparatus described herein may further include operations, features, means, or instructions for determining that the quantity of queued read commands satisfies a threshold quantity, where the data bus may be configured to operate in the second direction based on determining that the threshold quantity may be satisfied.

Some examples of the method 900 and the apparatus described herein may further include operations, features, means, or instructions for comparing the quantity of queued read commands with the threshold quantity, where the determination that the quantity of queued read commands satisfies the threshold quantity may be based on the comparison, and determining that the quantity of queued read commands may be assigned a low priority, where the comparison may be based on determining that the quantity of queued read commands may be assigned the low priority.

Some examples of the method 900 and the apparatus described herein may further include operations, features, means, or instructions for determining that a quantity of write commands issued after configuring the data bus to operate in the first direction satisfies a threshold quantity, where the data bus may be configured to operate in the second direction based on determining that the threshold quantity may be satisfied.

Some examples of the method 900 and the apparatus described herein may further include operations, features, means, or instructions for determining that fewer than a threshold quantity of queued write commands may be for banks that may have satisfied the timing constraint for activating different rows, where the data bus may be configured to operate in the second direction based on determining that fewer than the threshold quantity of queued write commands may be for banks that may have satisfied the timing constraint for activating different rows.

Some examples of the method 900 and the apparatus described herein may further include operations, features, means, or instructions for issuing activate commands associated with the quantity of queued read commands to the banks in between issuing activate commands associated with write commands for different banks.

Some examples of the method 900 and the apparatus described herein may further include operations, features, means, or instructions for transmitting first data associated with the queued write commands over the data bus while the data bus may be configured to operate in the first direction, and receiving second data over the data bus after configuring the data bus to operate in the second direction.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof. Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory comprising a plurality of banks that each have different rows; and
   a controller coupled with the memory and configured to cause the apparatus to:
   operate a data bus for the memory in a first direction that is relative to the memory and associated with a first type of access command;
   determine, for the memory, that a quantity of queued access commands of a second type are for a subset of banks, of the plurality of banks, each bank of which has satisfied a timing constraint for activating the different rows in that bank; and
   operate, based at least in part on determining that the quantity of queued access commands of the second type are for the subset of banks that have satisfied the timing constraint, the data bus in a second direction associated with the second type of access command.

2. The apparatus of claim 1, wherein the controller is further configured to cause the apparatus to:
   determine, for each bank of the subset of banks, that a threshold duration has elapsed since a last activate command was issued for that bank, wherein each bank of the subset of banks is determined to have satisfied the timing constraint based at least in part on determining that the threshold duration has elapsed for that bank.

3. The apparatus of claim 1, wherein the controller is further configured to cause the apparatus to:
   determine that the quantity of queued access commands of the second type satisfies a threshold quantity, wherein the data bus is configured to operate in the second direction based at least in part on determining that the threshold quantity is satisfied.

4. The apparatus of claim 1, wherein the controller is further configured to cause the apparatus to:
   determine that fewer than a threshold quantity of queued commands of the first type are for the subset of banks that have satisfied the timing constraint, wherein the data bus is configured to operate in the second direction based at least in part on determining that fewer than the threshold quantity of queued commands of the first type are for the subset of banks that have satisfied the timing constraint.

5. The apparatus of claim 1, wherein the controller is further configured to cause the apparatus to:
issue activate commands associated with the quantity of queued access commands of the second type to the subset of banks in between issuing activate commands associated with commands of the first type for a different subset of banks of the plurality of banks.

6. The apparatus of claim 1, wherein the first direction supports communication of data from the memory and the first type of access command comprises a read command, and wherein the second direction supports communication of data to the memory and the second type of access command comprises a write command.

7. An apparatus, comprising:
a memory comprising a plurality of banks that each have different rows; and
a controller coupled with the memory and configured to cause the apparatus to:
configure a data bus for the memory to operate in a first direction for communicating data read from the memory;
determine that a quantity of write commands queued for the memory are for a subset of banks, of the plurality of banks, each bank of which has satisfied a timing constraint for activating the different rows in that bank; and
configure, based at least in part on determining that the quantity of write commands queued for the memory are for the subset of banks that have satisfied the timing constraint, the data bus to operate in a second direction for communicating data to the memory.

8. The apparatus of claim 7, wherein the controller is further configured to cause the apparatus to:
determine, for each bank of the subset of banks, that a threshold duration has elapsed since a last activate command was issued for that bank, wherein each bank of the subset of banks is determined to have satisfied the timing constraint based at least in part on determining that the threshold duration has elapsed for that bank.

9. The apparatus of claim 7, wherein the controller is further configured to cause the apparatus to:
determine that the quantity of queued write commands satisfies a threshold quantity, wherein the data bus is configured to operate in the second direction based at least in part on determining that the threshold quantity is satisfied.

10. The apparatus of claim 9, wherein the controller is further configured to cause the apparatus to:
compare the quantity of queued write commands with the threshold quantity, wherein the determination that the quantity of queued write commands satisfies the threshold quantity is based at least in part on the comparing; and
determine that at least one write command in the quantity of queued write commands is assigned a higher priority relative to other queued write commands, wherein the comparison is based at least in part on determining that the at least one write command is assigned the higher priority.

11. The apparatus of claim 7, wherein the controller is further configured to cause the apparatus to:
determine that a quantity of read commands issued after configuring the data bus to operate in the first direction satisfies a threshold quantity, wherein the data bus is configured to operate in the second direction based at least in part on determining that the threshold quantity is satisfied.

12. The apparatus of claim 7, wherein the controller is further configured to cause the apparatus to:
determine that fewer than a threshold quantity of queued read commands are for the subset of banks that have satisfied the timing constraint, wherein the data bus is configured to operate in the second direction based at least in part on determining that fewer than the threshold quantity of queued read commands are for the subset of banks that have satisfied the timing constraint.

13. The apparatus of claim 7, wherein the controller is further configured to cause the apparatus to:
issue activate commands associated with the quantity of queued write commands to the subset of banks in between issuing activate commands associated with read commands for a different subset of banks of the plurality of banks.

14. The apparatus of claim 13, wherein the controller is further configured to cause the apparatus to:
receive first data requested by the read commands over the data bus while the data bus is configured in the first direction;
transmit the write commands to the memory, the write commands associated with second data; and
transmit the second data over the data bus after configuring the data bus to operate in the second direction.

15. An apparatus, comprising:
a memory comprising a plurality of banks that each have different rows; and
a controller coupled with the memory and configured to cause the apparatus to:
configure a data bus for the memory to operate in a first direction for communicating data to the memory;
determine that a quantity of read commands queued for the memory are for a subset of banks, of the plurality of banks, each of which has satisfied a timing constraint for activating the different rows in that bank; and
configure, based at least in part on determining that the quantity of read commands queued for the memory are for the subset of banks that have satisfied the timing constraint, the data bus to operate in a second direction for communicating data read from the memory.

16. The apparatus of claim 15, wherein the controller is further configured to cause the apparatus to:
determine, for each bank of the subset of banks, that a threshold duration has elapsed since a last activate command was issued for that bank, wherein each banks of the subset of banks is determined to have satisfied the timing constraint based at least in part on determining that the threshold duration has elapsed for that bank.

17. The apparatus of claim 15, wherein the controller is further configured to cause the apparatus to:
determine that the quantity of queued read commands satisfies a threshold quantity, wherein the data bus is configured to operate in the second direction based at least in part on determining that the threshold quantity is satisfied.

18. The apparatus of claim 17, wherein the controller is further configured to cause the apparatus to:
compare the quantity of queued read commands with the threshold quantity, wherein the determination that the quantity of queued read commands satisfies the threshold quantity is based at least in part on the comparison; and determine that the quantity of queued read commands are assigned a low priority, wherein the comparison is based at least in part on determining that the quantity of queued read commands are assigned the low priority.

19. The apparatus of claim 15, wherein the controller is further configured to cause the apparatus to:

determine that a quantity of write commands issued after configuring the data bus to operate in the first direction satisfies a threshold quantity, wherein the data bus is configured to operate in the second direction based at least in part on determining that the threshold quantity is satisfied.

20. The apparatus of claim 15, wherein the controller is further configured to cause the apparatus to:

determine that fewer than a threshold quantity of queued write commands are for the subset of banks that have satisfied the timing constraint, wherein the data bus is configured to operate in the second direction based at least in part on determining that fewer than the threshold quantity of queued write commands are for the subset of banks that have satisfied the timing constraint.

21. The apparatus of claim 15, wherein the controller is further configured to cause the apparatus to:

issue activate commands associated with the quantity of queued read commands to the subset of banks in between issuing activate commands associated with queued write commands for a different subset of banks of the plurality of banks.

22. The apparatus of claim 21, wherein the controller is further configured to cause the apparatus to:

transmit first data associated with the queued write commands over the data bus while the data bus is configured to operate in the first direction; and receive second data over the data bus after configuring the data bus to operate in the second direction.

* * * * *